United States Patent [19]

England et al.

[11] 4,427,583

[45] Jan. 24, 1984

[54] PROTEIN PRODUCTION

[75] Inventors: Richard England, Combe Down; John E. L. Bowcott, Bath; John S. Olds, Leighton Buzzard; Alan Jobling, Harpenden, all of England

[73] Assignee: Lensfield Products Limited, Bedford, England

[21] Appl. No.: 308,033

[22] Filed: Oct. 2, 1981

[30] Foreign Application Priority Data

Oct. 7, 1980 [GB] United Kingdom ............... 8032267

[51] Int. Cl.³ .......................... C07G 7/00; A23J 1/10
[52] U.S. Cl. .................................. 260/123.7; 426/657
[58] Field of Search ............... 260/112 R, 123.7, 118; 426/431, 437, 657, 480

[56] References Cited

U.S. PATENT DOCUMENTS

| 1,951,260 | 3/1934 | Sakom | 260/118 |
| 3,142,667 | 7/1964 | Grettie | 260/118 |
| 3,445,448 | 5/1969 | McCann | 260/118 |
| 4,176,199 | 11/1979 | Vollmer | 426/59 |
| 4,294,753 | 10/1981 | Urist | 260/112 R |

FOREIGN PATENT DOCUMENTS 2161654  6/1973  Fed. Rep. of Germany .

OTHER PUBLICATIONS

*Meat Processing*, Aug. 1980, "British Company Feels Profits in its Bones".
Herrmann, Dr. P., *Food Engineering Int'l*, Sep. 1979, pp. 41, 44, 46, 49, "Production of Gelatine from Cattle Bones".

*Primary Examiner*—John C. Bleutge
*Assistant Examiner*—Patricia Short
*Attorney, Agent, or Firm*—Larson and Taylor

[57] ABSTRACT

Protein and other useful products are recovered from animal bone by comminuting fresh bone to small particles which are defatted and then demineralized by maintenance in suspension in hydrochloric acid in a bone/acid counterflow treatment carried out by passing the bone particles through a series of tanks in counterflow with hydrochloric acid passed through the tanks in the reverse direction. Between the tanks the bone/acid mixture is separated and delivered to the respective successive tank in counterflow. After completion of the acid treatment the demineralized bone is separated and washed to produce the final product.

1 Claim, 1 Drawing Figure

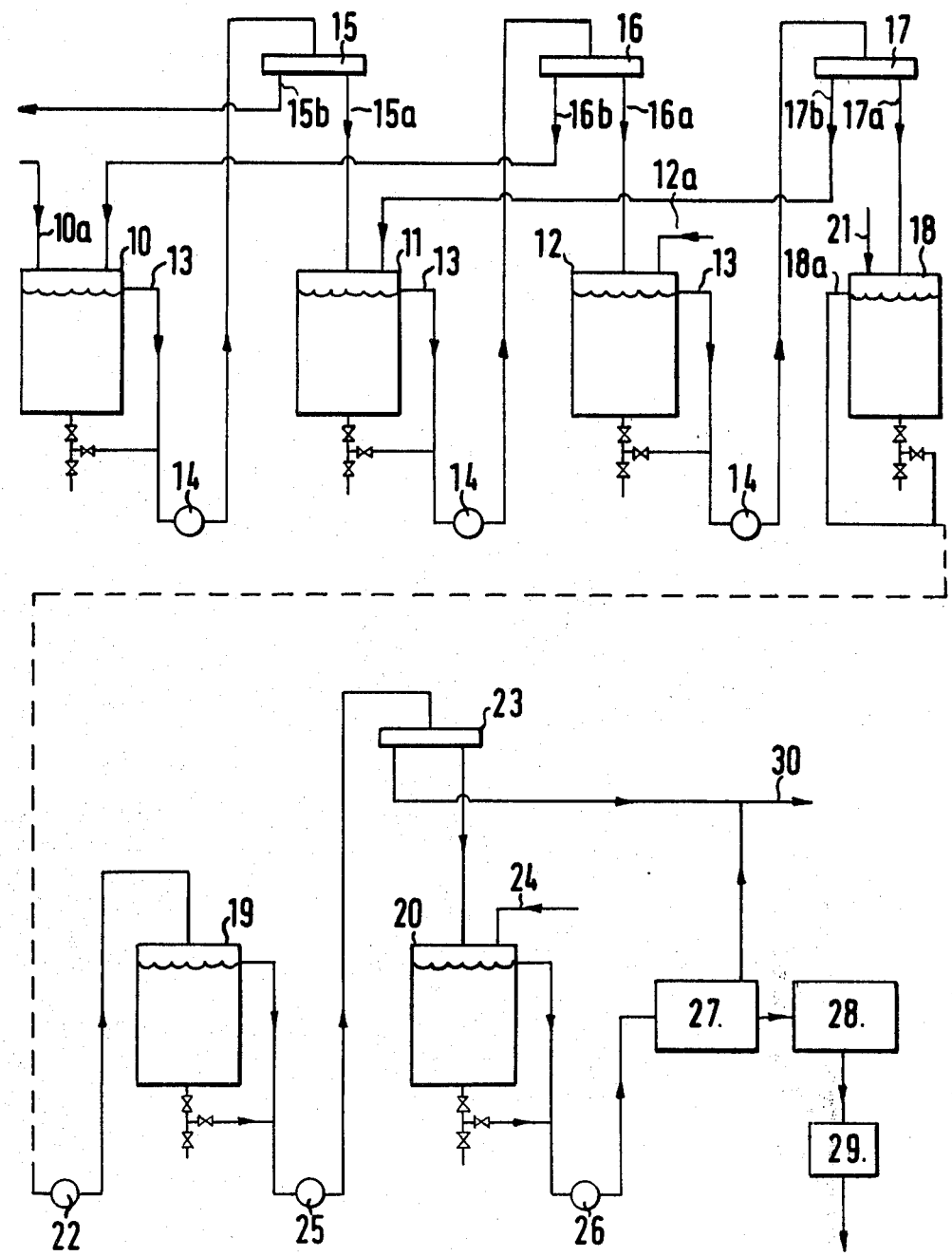

PROTEIN PRODUCTION

This invention relates to the recovery of protein and other useful products from animal bone by demineralisation with acid.

In such processes as known, broken and degreased bone is held in a mass in a vat during acid treatment at a temperature not exceeding 15° C., the acid at strongest being 6% by weight HCl. To effect substantial demineralisation, this treatment is continued for a period lasting from a few days up to four weeks.

Not only are the known processes laborious but also the ossein product is suitable only for animal feedstuff, or for further processing for gelatin production.

The invention provides a process and apparatus whereby both a substantial reduction in treatment time can be achieved and the ossein product is suitable for human consumption.

According to the invention, in a process for the recovery of useful products from animal bone by demineralisation of the bone with acid, fresh bone is comminuted to particles which can readily be maintained in suspension in the acid, the bone particles are defatted to reduce their animal fat content and the fresh comminuted defatted bone particles are maintained in suspension in the acid during demineralisation.

By fresh bone is meant bone which, after boning-out of a carcass, is maintained under standard meat hygiene conditions, for example kept in a clean store at a temperature not more than 3° C.

The bone may be comminuted by crushing to a particle size readily maintained in suspension in the acid, with stirring if necessary, during treatment. A most convenient particle size is about 7 mm or less. The bone is defatted to reduce the animal fat content to an amount of about not more than 5%, preferably 2%-3%, by weight on a dry basis. Defatting may be carried out by a known water-washing method which does not affect the edible nature of the final product.

As a result of the fresh comminuted defatted bone particles being maintained in suspension in the acid during treatment, we have found that the process may be carried out at a temperature up to 25° C. and with an initial hydrochloric acid strength of about 6% by weight, e.g. 7% to 8%, so that the treatment time is reduced to a few hours, e.g. to about 4½ hours or even less, without excessive hydrolysis of the protein occurring.

Further, as a result of the bone in particle form being maintained in suspension during treatment, it is possible to carry out the treatment on a continuous bone/acid counterflow basis, by continuously transferring the bone to successive reaction vessels and transferring the acid between these vessels in the opposite direction.

Accordingly, in carrying out the process of the invention in a preferred manner, fresh comminuted defatted bone is passed continuously through a series of treatment vessels in counterflow to hydrochloric acid initially of about 6% to 8% strength by weight at a temperature of between 10° C. and 25° C., the treatment time being sufficient to effect substantial demineralization of the bone, the demineralised bone being recovered and treated to produce a protein product. Also "dicalcium phosphate" can be recovered as a valuable product from the spent acid. In carrying out the process, the acid is cooled if necessary to ensure that its temperature is not more than 25° C.

A counterflow process may be carried out in a series of interconnected treatment vessels to which fresh bone particles and acid are delivered, to different vessels, and from which a mixture of bone particles in suspension in acid is withdrawn, the mixture being separated into its bone particles and acid constituents and the constituents respectively being returned to treatment vessels so as to flow in counterflow through successive vessels whereby fresh bone particles first encounter acid which has already acted upon bone particles and fresh acid encounters bone particles which have already been acted upon by acid.

The invention also comprises apparatus for carrying out the process comprising a series of treatment vessels, means for drawing off from each vessel a mixture of bone particles and acid, means for separating the mixture into its bone particles and acid constituents and means for delivering the separated constituents to the vessels to flow in counterflow through the series of vessels. Means may be provided for returning acid from the respective separator to the tank from which it is drawn.

Each vessel may have a stirrer for agitating the vessel contents sufficiently to maintain the bone particles in suspension and distributed substantially uniformly throughout the acid. Further each vessel conveniently has a weir-type outlet for drawing off bone/acid mix continuously.

A preferred method of protein recovery and one convenient arrangement of apparatus for carrying it out in accordance with the invention will now be described with reference, by way of example, to the accompanying diagrammatic drawing.

The starting material is fresh bone, preferably of one species, e.g. beef bone or pig bone rather than a mixture of such bones. The bone is crushed so that it is comminuted to a particle size of 7 mm or less and defatted, by water-washing, to reduce its fat content to 2%-3% on a dry weight basis.

The bone particles are fed in turn through a series of demineralising tanks, in the illustrated plant there being three tanks 10, 11 and 12, containing hydrochloric acid which is fed in the reverse direction, that is through tanks 12, 11, 10 in turn. The fresh bone particle input is 10a and the fresh acid input is 12a.

Each of the tanks preferably contains a stirrer (not shown), which agitates the bone particle/acid mix sufficiently to maintain the bone particles in suspension, and has a weir-type outlet at 13 over which the mix is continuously drawn off to be delivered to a pump 14.

The pumps 14 deliver to respective screen type separators 15, 16, 17, each having an outlet 15a, 16a, 17a, for bone, and a drained acid outlet 15b, 16b, 17b. The separators are conveniently well-known vibratory screen separators.

The bone outlet 15a leads to tank 11 and the bone outlet 16a to tank 12. The bone outlet 17a leads to a protein recovery section hereinafter described.

The acid outlet 17b leads to tank 11, acid outlet 16b to tank 10 and acid outlet 15b leads spent acid to known apparatus for recovery of a valuable commercial product known industrially as "dicalcium phosphate". By means of cross-connections (not shown) a proportion of the acid from any of the separators may be returned to the tanks if required to maintain a sufficient overflow rate.

The strength of the hydrochloric acid at the input 12a is about 7% by weight (between 6% and 8%) and at the input 12a the acid, cooled if necessary, has a temperature between 10° C. and 25° C. This temperature is maintained throughout the three tanks 10, 11, 12. The rate of flow of the bone particles is maintained to give a treatment time in each tank of about 60 minutes which is sufficient to effect substantial demineralisation of the bone particles and to avoid excessive hydrolysis of the ossein.

The protein recovery section of the plant comprises three washing tanks 18, 19, 20, each similar in arrangement to the demineralisation tanks 10, 11, 12. Tank 18 receives demineralised bone particles from outlet 17a and water from an input 21. The suspension of bone particles in water overflows from a weir 18a and is conveyed by a pump 22 to a tank 19. The suspension overflow from the tank 19 is delivered by a pump 25 to a screen separator 23 from which demineralised bone particles are delivered to the tank 20 which is fed with water at 24.

The suspension overflow from the tank 20 is delivered by a pump 26 to a centrifuge 27 from which the solids pass to a dryer 28 and a mill 29. The acid washings are carried away at 30.

EXAMPLE 1

The following is an example of the demineralisation of defatted beef bone.

Crushed and water-defatted fresh beef bone having a maximum fat content of 3.0% dry basis, an ash content of 55% dry basis and a particle size of 7 mm or below, is fed into tank 10 via a feed scroll 10a at a rate of 475 kg per hour dry basis. The temperature of the feed material is ambient, typically 10°–20° C.

The three demineralising tanks 10, 11 and 12 contain acid of differing concentration and the liquid level in each tank is maintained near the top by an overflow weir. Each tank is stirred to give a uniform suspension of bone in acid.

The feed material has an average residence time in tank 10 of 60 minutes. The bone and acid mixture overflows from tank 10 and is pumped via pipe 13 to a vibratory screen 15 where the solid and liquid fractions are separated. The bulk of the liquid passes via pipe 15b to a spent acid treatment plant but a proportion is returned to tank 10, by a cross connection (not shown), to maintain a sufficient overflow rate. The composition of the spent acid is typically:
Total chloride (as HCl): 40 g/liter
Free acid (as HCl): 19 g/liter
Calcium (Ca): 17 g/liter The bone solids fraction from 15 passes via a chute 15a to tank 11 which contains a higher acid concentration. Again after an average residence time of 60 minutes, the bone and acid mixture overflows via pipe 13 and is pumped to vibratory screen 16 where the solid and liquid fractions are separated. The liquid fraction passes back to tank 10 via pipe 16b with a proportion returning to tank 11, through a cross connection (not shown), to maintain a sufficient overflow rate. The solid fraction passes via a chute 16a to tank 12 which contains the highest concentration of acid. This tank receives fresh acid via pipe 12a at a rate of 1800 liters per hour and at an average concentration of 8% by weight. The acid temperature is ambient, typically 10°–20° C., but facilities exist to chill the acid if high ambient temperatures are experienced. After an average residence time of 60 minutes in tank 12 the demineralised bone and acid mixture overflows and is pumped via pipe 13 to vibratory screen 17 where the solid and liquid fractions are separated. The liquid fraction passes back to tank 11 via pipe 17b with a proportion returning to tank 12 to maintain a sufficient overflow rate. The solid fraction passes via chute 17a to tank 18 where the washing cycle begins.

Fresh water at ambient temperature is added to tank 18 at a rate of 10,000 liters per hour and the tank contents are stirred to maintain a uniform suspension. As the demineralised bone in water suspension overflows from tank 18 it is pumped to tank 19 which is also stirred. As the demineralised bone suspension overflows from tank 19 it is pumped to vibratory screen 23 where the solid and liquid fractions are separated. The liquid fraction passes to the effluent plant via pipe 30 where it is used either in effluent treatment or as make-up for dilute acid. The composition of this liquid fraction is typically:
Total chloride (as HCl): 20 g/liter
Free acid (as HCl): 16 g/liter
Calcium (Ca): 3 g/liter The solid fraction from screen 23 passes into tank 20 where more fresh water is added at the rate of 1500 liters/hr and at ambient temperature. The tank is stirred to maintain a suspension of demineralised bone in water and the pH of this suspension is adjusted continuously to ≈5.5 by the addition of sodium carbonate solution under the control of a pH electrode.

The demineralised bone suspension overflows from tank 20 and is pumped to a decanter centrifuge where it is partially dewatered to give a final wet product of typical composition:
$H_2O$: 75%
Ash: 1%
Protein: 24%

EXAMPLE 2

Demineralisation of pork bone.

Crushed and defatted fresh pork bone is treated in the same way as the beef bone of Example 1 except for the following.

(a) The ash content of the pork bone is 50% dry basis.
(b) The composition of the spent acid is
Total Chloride (as HCl): 32 g/liter
Free acid (as HCl): 14 g/liter
Calcium (Ca): 12 g/liter (c) Tank 12 receives fresh acid via the pipe 12a at an average concentration of 6% by weight.

(d) The composition of the liquid fraction passing to the effluent plant via the pipe 30 is:
Total Chloride (as HCl): 14 g/liter
Free acid (as HCl): 11 g/liter
Calcium (Ca): 1 g/liter The typical final wet product has the same composition as in Example 1.

The resulting protein product typically contains more than 90% protein and the yield of recovered protein on a raw bone basis is typically 14%. Due to the use of fresh bone and to the short treatment time, the product has a low bacterial count.

A typical product has the following properties:
Appearance: Pale brown powder.
Grist: 95% through BS 1.0 mm aperture sieve.
pH (10% suspension): 4.5
Water absorption: 300–400% at room temperature.
Moisture: Maximum 6%
Fat: Maximum 5%
Ash: Maximum 5%

Nitrogen: Minimum 14.4%
Protein (nitrogen×6.25): Minimum 90%
Chloride (NaCl): Maximum 3%
Total bacterial count (48 hours×37° C.): Maximum 1000 per g
E. Coli: Absent from 1 g sample
Salmonellae: Absent from 10 g sample

I claim:

1. A process for the recovery of edible ossein protein from animal bone comprising the following steps:
   (a) crushing fresh bone to particles of 7 mm or less,
   (b) defatting the bone particles to reduce the fat content thereof to not more than 5% on a dry weight basis,
   (c) mixing the defatted bone particles in dilute hydrochloric acid, which has already contacted bone particles, in a first treatment vessel to form a mixture of bone particles freely suspended in acid,
   (d) passing the bone particles in counterflow to dilute hydrochloric acid through a series of treatment vessels, containing said dilute hydrochloric acid in which the particles are maintained in suspension by agitation thereof, by separating bone particles from the acid in passage thereof between treatment vessels and passing the separated bone particles and acid to different vessels,
   (e) during step (d) supplying fresh acid in a strength of 6% to 8% by weight to a treatment vessel other than the first treatment vessel,
   (f) controlling the temperature of the mixture in the treatment vessels to a maximum of 25° C.,
   (g) continuing the process steps (d) through (f) so that in a few hours the bone particles are substantially demineralised, and
   (h) separating and washing said demineralised bone particles to recover the edible ossein protein solid product.

* * * * *